United States Patent
Kherroubi et al.

(10) Patent No.: US 9,869,798 B2
(45) Date of Patent: Jan. 16, 2018

(54) METHOD FOR ESTIMATING A LOGGING TOOL RESPONSE IN A LAYERED FORMATION

(71) Applicant: Schlumberger Technology Corporation, Sugar land, TX (US)

(72) Inventors: Josselin Kherroubi, Paris (FR); Laurent Mosse, Rio de Janeiro (BR); Ollivier Faivre, Paris (FR)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 743 days.

(21) Appl. No.: 14/458,254

(22) Filed: Aug. 13, 2014

(65) Prior Publication Data

US 2015/0073712 A1    Mar. 12, 2015

Related U.S. Application Data

(63) Continuation-in-part of application No. PCT/IB2012/050396, filed on Jan. 27, 2012.

(30) Foreign Application Priority Data

Jan. 28, 2011   (EP) .................... 11290055

(51) Int. Cl.
*G01V 3/30*     (2006.01)
*G01V 99/00*    (2009.01)
*G01V 3/02*     (2006.01)

(52) U.S. Cl.
CPC .......... *G01V 99/005* (2013.01); *G01V 3/02* (2013.01); *G01V 3/30* (2013.01)

(58) Field of Classification Search
None
See application file for complete search history.

(56) References Cited

U.S. PATENT DOCUMENTS

| | | | |
|---|---|---|---|
| 4,467,425 A | 8/1984 | Schaefer et al. | |
| 4,818,946 A | 4/1989 | Barber | |
| 4,837,517 A | 6/1989 | Barber | |
| 5,210,691 A | 5/1993 | Freedman et al. | |
| 5,446,654 A | 8/1995 | Chemali et al. | |
| 5,568,394 A * | 10/1996 | Krikorian | G01S 3/043 342/156 |

(Continued)

OTHER PUBLICATIONS

M. Spalburg, "An Algorithm for Simultanious Deconvolution, Squaring and Depth-Mathingof Logging Data," SPWLA Thirtieth Annual Logging Symposium, Jun. 11, 1989, pp. 1-7.

(Continued)

*Primary Examiner* — Michael Lebentritt
(74) *Attorney, Agent, or Firm* — Michael Dae

(57) ABSTRACT

A logging method and a logging tool for approximating a logging tool response in a layered formation are provided. The method includes obtaining a first layered profile of at least one first measurement log provided by a logging tool using a squaring process, obtaining a filtered measurement log from the first layered profile using a forward physical model for the logging tool, and estimating an approximation of the forward physical model using a parameterized function so as to provide a first logging tool response.

14 Claims, 6 Drawing Sheets

(56) References Cited

U.S. PATENT DOCUMENTS

| | | | |
|---|---|---|---|
| 5,867,806 A * | 2/1999 | Strickland | G01V 3/38 702/7 |
| 6,253,155 B1 * | 6/2001 | Hagiwara | G01V 1/48 702/9 |
| 7,242,194 B2 | 7/2007 | Hayman et al. | |
| 7,256,582 B2 | 8/2007 | Gorek et al. | |
| 7,269,514 B2 * | 9/2007 | Xiao | G01V 3/28 324/339 |
| 7,286,937 B2 | 10/2007 | Goswami et al. | |
| 7,391,675 B2 * | 6/2008 | Drew | G01V 1/008 367/40 |
| 7,814,036 B2 * | 10/2010 | Chen | G01V 3/38 250/253 |
| 8,775,084 B2 * | 7/2014 | Rabinovich | E21B 47/09 324/355 |
| 9,035,657 B2 * | 5/2015 | Zhang | G01V 3/28 324/323 |
| 9,429,675 B2 * | 8/2016 | Yang | G01V 3/28 |
| 9,638,022 B2 * | 5/2017 | Bittar | E21B 47/00 |
| 2004/0019427 A1 * | 1/2004 | San Martin | G01V 3/28 702/6 |
| 2006/0161352 A1 * | 7/2006 | Goswami | G01V 3/18 702/11 |
| 2008/0224705 A1 | 9/2008 | Simon et al. | |
| 2009/0309601 A1 | 12/2009 | Simon | |
| 2012/0185225 A1 * | 7/2012 | Onda | E21B 43/26 703/10 |
| 2012/0253676 A1 * | 10/2012 | Dong | G01V 3/38 702/7 |
| 2013/0006535 A1 * | 1/2013 | Zhang | G01V 5/08 702/7 |
| 2014/0222405 A1 * | 8/2014 | Lecerf | G06G 7/50 703/10 |
| 2015/0015250 A1 * | 1/2015 | Gzara | G01V 3/32 324/303 |
| 2016/0216405 A1 * | 7/2016 | Rasmus | G01V 11/00 |
| 2016/0245952 A1 * | 8/2016 | Dupuis | G01V 3/18 |

OTHER PUBLICATIONS

W.C. Chew, Waves and Fields in Inhomogeneous Media, ISBN: 0-7803-4749-8, 1995, Wiley, IEEE Press.

K. Turner, et al, "A new algorithm for automatic shoulder bed correction of dual laterolog toos," SPWLA 32 Annual Logging Symposium, Jun. 16-19, 1991.

P. Weiss, et al, "Efficient Schemes for Total Variation Minimization Under Constraints in Image Processing," SIAM Journal on Scientific Computing, vol. 31, Issue 3, Feb. 2009.

* cited by examiner

METHOD FOR ESTIMATING A LOGGING TOOL RESPONSE IN A LAYERED FORMATION

RELATED APPLICATIONS

This application is a continuation-in-part of and claims the benefit of priority to PCT/1132012/050396, filed January 2012, which claims the benefit of priority to European Patent Application 11290055.0, filed Jan. 28, 2011.

FIELD OF THE DISCLOSURE

The present disclosure relates to a method for estimating at least one logging tool response in a layered formation, a logging tool configured to perform such a method, as well as an apparatus for determining at least one formation property of a layered formation surrounding a borehole.

BACKGROUND OF THE DISCLOSURE

The measurements of downhole formation properties surrounding a borehole, such as for example the measurement of the dielectric permittivity of a formation, are known to provide useful information about the formations. The formation properties of different materials forming the formations may vary, so that the measurement of the formation properties can be a useful means for evaluating the formation. Logging methods and tools for this purpose have been developed over the years.

In layered formations, shoulder beds may have undesirable effects on measurement logs performed to estimate formation properties. Shoulder beds effects may be present in thinly laminated formations. In the present description and in the following claims, thinly laminated formations are formations comprising thin laminations, such as for example smaller than 6 inches.

Further, shoulder beds effects may particularly affect measurement logs taken at relatively low frequencies, such as for example lower than 400 MHz.

Original log profiles may be either smoothed with overshoot and undershoot patterns, or distorted. This can lead to an erroneous estimation of the formation properties.

It is therefore desirable to correct any shoulder beds effects so as to obtain accurate measurements of downhole formation properties. In order to correct any shoulder beds effects, a tool response or multiple tool responses in layered formations should be approximated with good accuracy.

SUMMARY OF THE DISCLOSURE

The present disclosure provides a method for estimating at least one logging tool response in a layered formation, the method comprising:
a) obtaining a first layered profile of at least one first measurement log of at least one first formation property provided by a logging tool using a squaring process;
b) obtaining a filtered measurement from the first layered profile using a forward physical model for the logging tool; and
c) estimating an approximation of the forward physical model using a parameterized function so as to provide a first logging tool response.

Further, the present disclosure provides a method for estimating at least one logging tool response in a layered formation, the method comprising:
a) selecting at least one first measurement log taken at a first frequency so as to provide a first logging tool response;
b) approximating the first logging tool response for the at least one first measurement log;
c) deconvolving the at least one first measurement log using the approximated first logging tool response to correct the at least one first measurement log from shoulder bed effects;
d) selecting at least one second measurement log taken at a second frequency lower than the first frequency;
e) approximating the second logging tool response for the at least one second measurement log using the deconvolved at least one first measurement log;
f) deconvolving the at least one second measurement log using the approximated second logging tool response to correct the at least one second measurement log from shoulder bed effects; and
g) when the at least one second measurement log comprises a plurality of second measurement logs, repeating d) to f) for the rest of the second measurement logs.

Further, the present disclosure provides a logging tool configured to perform such methods and an apparatus for determining at least one formation property of a layered formation surrounding a borehole. The apparatus comprises:
 a logging tool as defined above;
 at least one transmitting antenna; and
 a plurality of receiving antennas spaced in relation to the at least one transmitting antenna.

LIST OF DRAWING FIGURES

DETAILED DESCRIPTION OF EMBODIMENTS OF THE DISCLOSURE

In the following, embodiments of a method for estimating at least one logging tool response in a layered formation, of a logging tool configured to perform such a method, as well as of an apparatus for determining at least one formation property of a layered formation surrounding a borehole will be described.

The method according to the present disclosure results in an improvement of the vertical resolution of the at least one logging tool response.

If not otherwise indicated, the values of any formation property will be assumed to be constant in each layer of the layered formation.

Figure 1:
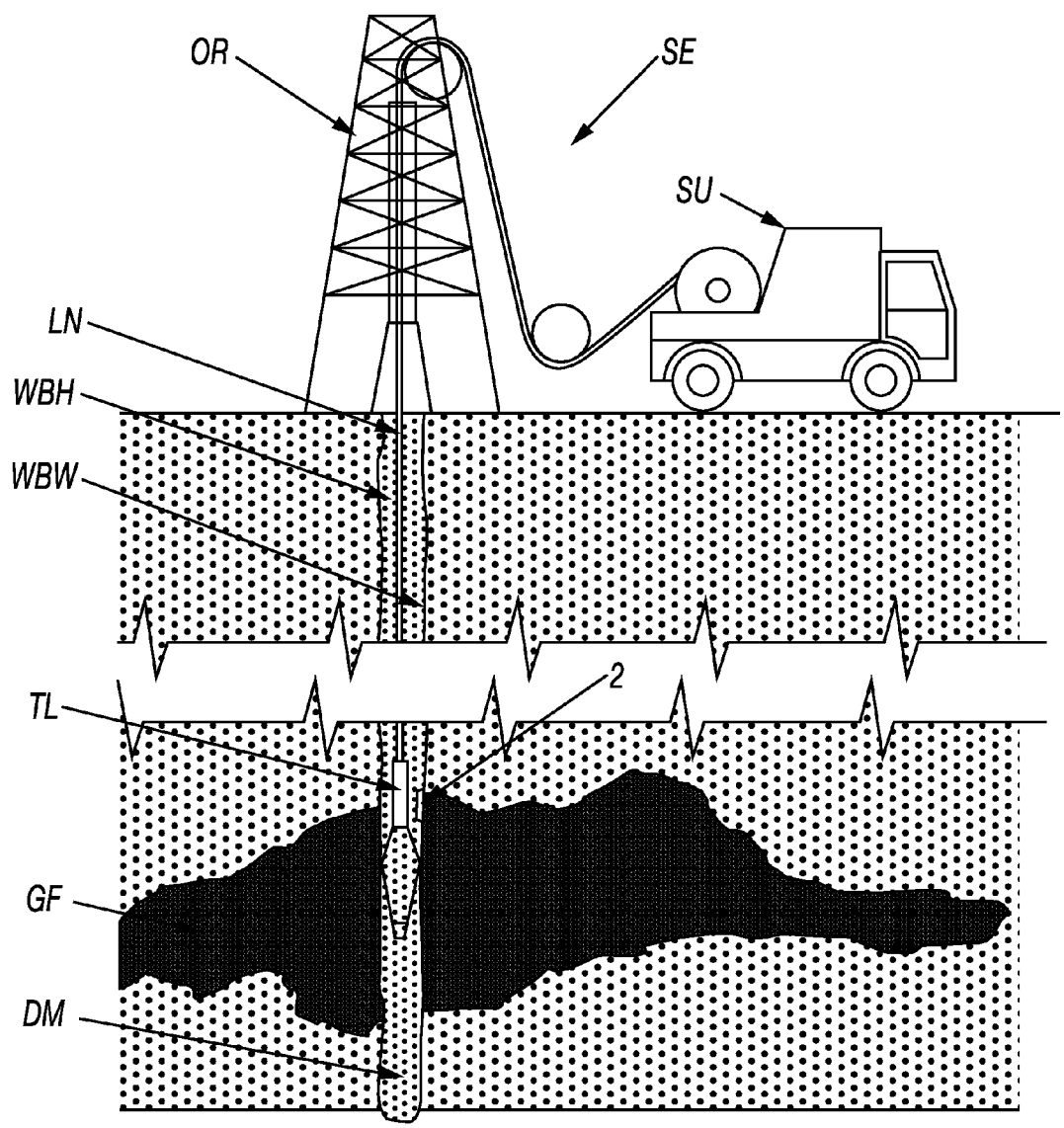
FIG. 1 shows an example of an onshore hydrocarbon well location.
Figure 2:
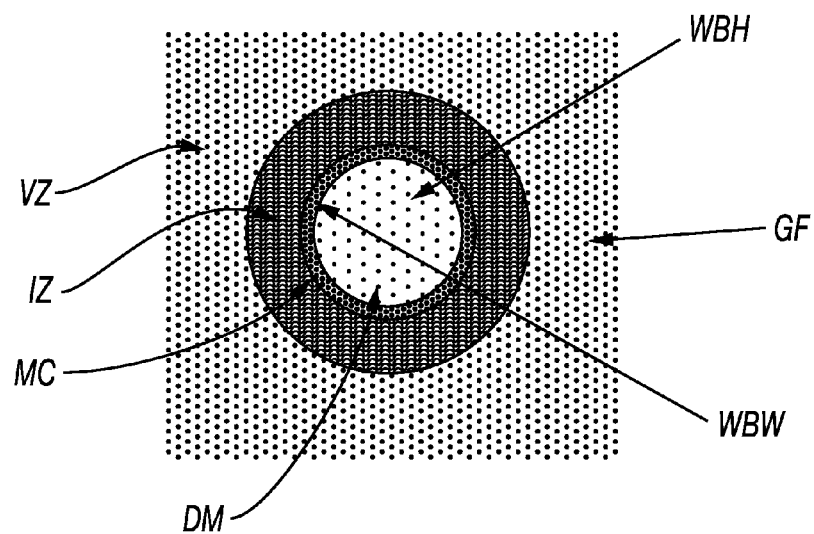
FIG. 2 shows a top cross-section view of a hydrocarbon layered formation.

FIG. 1 schematically shows an onshore hydrocarbon well location and surface equipments SE above a hydrocarbon layered formation GF after drilling operation has been carried out and before a casing string is run and cementing operations are carried out. FIG. 2 is a top cross-section view in the layered formation GF. A borehole WBH is filled with a fluid mixture DM. The fluid mixture DM is a mixture of drilling fluid and drilling mud. A wellbore wall WBW screens the particles of mud suspended into the fluid mixture DM. Thus, a shallow layer of mud, known in the art with the name of mudcake MC, forms on the wellbore wall WBW. A flushed or invaded zone IZ forming a first concentric volume surrounds the borehole WBH. The fluid mixture DM filtrates through the mudcake MC and penetrates into the formation, forming an invaded zone IZ. The radial depth of the invaded zone IZ varies from a few inch to a few feet. A virgin zone VZ surrounds the invaded zone IZ. The virgin zone VZ is only filled with the natural formation fluid. A further transition zone may be present between the invaded zone IZ and the virgin zone VZ.

In the example shown in FIG. 1, an apparatus for determining at least one formation property of a layered formation surrounding the borehole WBH is shown.

The apparatus comprises a logging tool TL configured to perform an embodiment of the method according to the present disclosure. Examples of suitable logging tools are described in U.S. patent application Ser. No. 11/816,309 and U.S. Pat. Nos. 7,242,194 and 7,256,582, the entirety of which documents is herein incorporated by reference.

Further, in FIG. 1, surface equipments SE comprise an oil rig OR and a surface unit SU for deploying the logging tool TL. The surface unit SU may be a vehicle coupled to the logging tool TL by a line LN. Further, the surface unit SU comprises an appropriate device for determining the depth position of the logging tool TL relatively to the surface level. The logging tool TL may comprise a centralizer. The centralizer may comprise a plurality of mechanical arms which can be deployed radially for contacting the wellbore wall WBW. The mechanical arms ensure a correct positioning of the logging TL tool along the central axis of the borehole WBH. The logging tool TL comprises various sensors and provides various measurement data related to the layered formation GF and/or to the fluid mixture DM. These measurement data are collected by the logging tool TL and transmitted to the surface unit SU.

The surface unit SU comprises processing circuitry, for example including appropriate electronic and software arrangements for processing, analyzing and storing the measurement data provided by the logging tool TL. According to another embodiment, such processing circuitry may be located downhole in or near the logging tool TL. Such processing circuitry is capable of handling all the processing functionality pertaining to the various measurements and models described herein.

Although FIG. 1 is shown for a wireline application, the embodiments described herein are equally applicable to a logging while drilling application. In other words, the logging tool may be attached to a separate wire or cable controlling the movements of the logging tool, as shown in the embodiment of FIG. 1, but it is also possible for the different functionality of the logging tool to be incorporated into the actual drill pipe, for example on the drill collar. Thus, improved imaging techniques can be obtained and used during the initial drilling stage.

Figure 3:
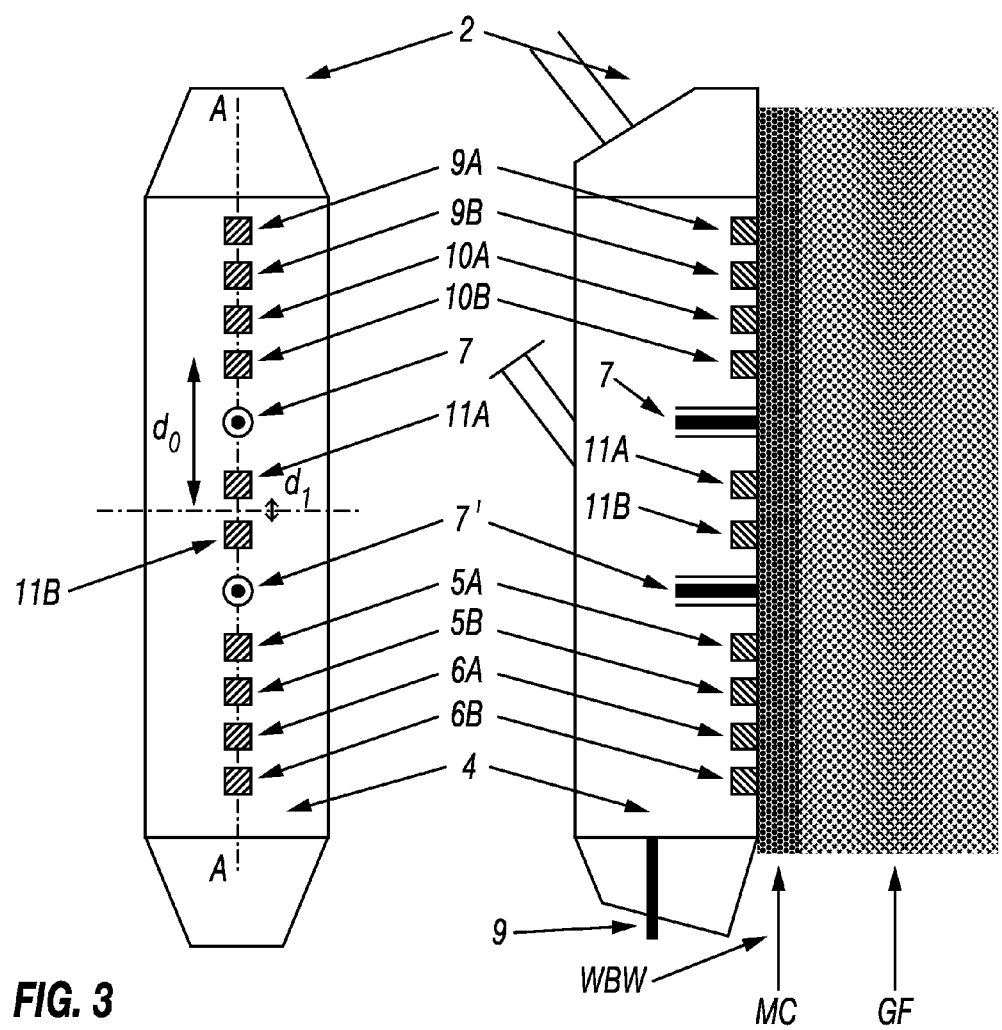
FIG. 3 shows two different views of an apparatus according to one embodiment of the present disclosure.

As shown in FIG. 3, the logging tool TL comprises a pad 2 adapted for engagement with the borehole WBH. The pad 2 may be a conductive metal housing, and for example may be made of a metallic material such as stainless steel. The pad 2 is coupled to the logging tool TL by a deploying arrangement, for example an arm, that enables the deployment of the pad 2, from the logging tool TL into the borehole WBH. Once the logging tool TL is positioned at a desired depth, the pad 2 can be deployed from the logging tool TL against the wellbore wall WBW by a deploying arrangement, for example an arm.

Further, according to an embodiment, the above-mentioned apparatus comprises at least one transmitting antenna and a plurality of receiving antennas spaced in relation to the at least one transmitting antenna. An embodiment of the apparatus is shown in FIG. 3, showing two different profile views of the logging tool TL. The first profile is viewed as seen from the layered formation GF, while the second profile is viewed side-on to the layered formation GF and shows the logging tool TL aligned adjacent to the mudcake MC. In the embodiment of FIG. 3, the apparatus comprises two transmitters 7, 7' and eight receivers distributed axially along a length of the logging tool TL. In FIG. 3, there are four receivers, designated by 9A, 9B, 10A and 10B and located above an upper transmitter 7, and other four receivers, designated by 5A, 5B, 6A and 6B and located below a lower transmitter 7', and two further receivers designated by 11A, 11B, and located between the upper 7 and the lower transmitter 7'.

It is possible to configure the two transmitting antennas to define a central point between them. As shown in FIG. 3, each antenna is spaced from a distance $d_0$ from the central point. The distance $d_0$ defines the depth of investigation, whereas the distance $d_1$ between the two transmitters defines the vertical resolution. The eight receiving antennas can be grouped into sets, for example 4 sets, wherein each set comprises two receiving antennas positioned on each side of the transmitting antennas. By varying the spacing of the sets of receiving antennas from the central point it is possible to vary the depth of investigation of the tool. In other words, the respective sets of receiving antennas, being at different spacings from the central points, are able to investigate at different radial depths into the formation.

Thus, the transmitter/receiver arrangement shown in FIG. 3 relies on electromagnetic wave propagation for measurements. The general principle of these measurements is to record at a receiver the voltage induced by a propagating electromagnetic field emitted at a transmitter.

According to an embodiment of the present disclosure, a method for estimating at least one logging tool response in a layered formation may refer to a method wherein the logging tool TL is a dielectric tool. In case of a resistivity logging tool, the formation property is resistivity. However, any other kind of measurement logs are possible. Although embodiments of the present disclosure refer to measurements of the conductivity and the permittivity of the formation, other formation properties may be measured.

With reference to a dielectric tool, according to an embodiment a method for estimating at least one tool response comprises obtaining a first layered profile of at least one first measurement log of permittivity. The at least one first measurement log may be taken at a first predetermined frequency.

According to an embodiment, the at least one first measurement log may include a plurality of measurements.

Figure 5:
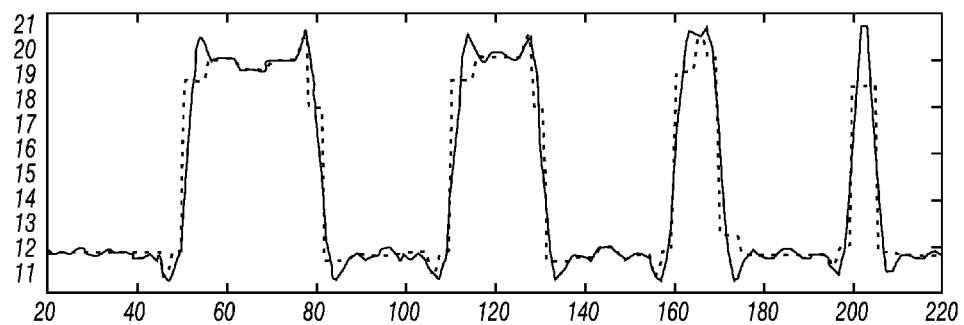
FIG. 5 shows results obtained from a squaring process according to an embodiment of the method of the present disclosure.

The first layered profile may be obtained by using a squaring process. The squaring process provides a squared log capturing the environment in terms of layer thickness distribution and property distribution within the layers. An example of results obtained from a squaring process according to an embodiment of the method of the present disclosure is shown in FIG. 5.

A filtered measurement may be obtained from the first layered profile using a forward physical model for the logging tool. Forward modeling is described in, e.g., Weng Cho Chew, Waves and Fields in Inhomogenous Media, ISBN: 978-0-7803-4749-6, January 1999, Wiley-IEEE Press.

The method may be performed by an approximation model of a forward physical model. An approximation of the forward physical model may be estimated using a parameterized function so as to provide a first logging tool response.

The forward physical model may be approximated by a parameterized and simplified approximation model that is fast to run and particularly, but not exclusively, useful and practical for layered formations.

According to an embodiment, the approximation can be expressed as follows:

$$x_{meas}(z)=FM(x_{true})+\text{noise}\approx f(x_{true}, \alpha)+\text{noise}$$

where:
- $x_{true}(z)$ represents the at least initial one log to be recovered. $x_{true}(z)$ is a function of depth and is not affected by shoulder beds effects: it is a squared log;
- $x_{meas}(z)$ represents the at least one measurement log provided by the logging tool. $x_{meas}(z)$ is a function of depth and may be affected by shoulder beds effects and/or noise;
- FM represents a forward model where the input(s) the original squared log; and
- $f$ represents a function that approximates the layered forward model.

The function $f$ may be parameterized by a parameter vector $\alpha$.

According to an embodiment, the approximation of the forward physical model may be, for example, a convolution, i.e. a linear approximation. However, the approximation of the forward physical model may be any other kind of function, for instance a polynomial approximation.

In case of convolution, the vector $\alpha$ is composed of the values of the convolution kernel and the shoulder beds effect may behave like a direct filter.

In case of polynomial approximation, the vector $\alpha$ is composed of the coefficients of the polynomial.

The function $f$ may be nonlinear on the parameter vector $\alpha$.

The logs $x_{meas}$ and $x_{true}$ may be complex functions of the depth. In this case, the function $f$ is a complex function.

According to an embodiment, a convolution is used. In such embodiment, the approximation model may be for example expressed by a convolution kernel k:

$$x_{meas}(z)=FM(x_{true}(z))+\text{noise}\approx k(x_{true}(z))*x_{true}(z)+\text{noise}$$

By using the squaring process, the dynamic logging tool response is estimated, thus performing a local estimation of the logging tool response. The dynamic estimation may take account, for example, of the layer profiles and of the environment.

According to an embodiment, the above-mentioned approximation may be used as input for a subsequent deconvolution algorithm for correcting the at least one measurement log from shoulder beds effects.

Example of deconvolution are disclosed in U.S. Pat. Nos. 4,467,425, 4,818,946, 4,837,517, 5,867,806, 5,867,806, 7,286,937, K. Turner, D. Tones, Roland Chemali, Halliburton Logging Services, "A new algorithm for automatic shoulder bed correction of dual laterolog tools", SPWLA 32 Annual Logging Symposium, Jun. 16-19, 1991, and Pierre Weiss, Laure Blanc-Féraud, Gilles Aubert, "Efficient Schemes for Total Variation Minimization Under Constraints in Image Processing", SIAM Journal on Scientific Computing, Volume 31 Issue 3, February 2009, which are all incorporated by reference herewith.

According to an embodiment, the method further comprises deconvolving the at least one first measurement log to correct the at least one first measurement log from shoulder bed effects.

The method may further comprise decoupling vertical and radial shoulder beds effects.

According to an embodiment, deconvolving the at least one first measurement log may comprise determining layer boundaries, correcting the at least one first measurement log from vertical shoulder beds effects, and performing a radial inversion on each layer independently to assess the at least one first formation property in each radial zone.

The method herein described for estimating at least one tool response in a layered formation may be also applied to multiple logging tool responses. The method may be performed also for estimating multiple logging tool responses, i.e. for processing multiple measurements of different type, for example the above-mentioned at least one first measurement log taken at a first frequency and at least one second measurement log, which may be taken at a second frequency. The second frequency may be lower or greater than the first frequency. According to an embodiment, the second frequency may be lower than the first frequency.

However, the multiple measurements of different type may be measurements taken at the same predetermined frequency. For example, when the logging tool is a propagation logging tool comprising an array of transmitters and receivers with different frequencies, spacings and polarizations, the propagating waves may be varied according to frequency, spacing and/or polarization for determining the properties of the formation. Using electromagnetic waves having different spacings, frequency and polarization result in an extraction of more accurate radial information of the borehole characteristics. An example of such a logging tool is available from Schlumberger and designated as Dielectric Scanner™. Such a logging tool is for example described in US patent application US 2009/0309601, which is hereby incorporated by reference in its entirety.

When the method is intended to estimate multiple tool responses, the method may comprise obtaining a second layered profile of at least one second measurement log provided by the tool using a squaring process.

According to an embodiment of the present disclosure, the at least one second formation property is conductivity. However, according to further embodiments, the at least one second formation property is conductivity and permittivity. The at least one second measurement log may be of other kind: for example, a resistivity measurement or a nuclear measurement may be performed.

The method may further comprise obtaining a filtered measurement from the second layered profile using a forward physical model for the logging tool, estimating an approximation of the forward physical model using a parameterized function so as to provide a second logging tool response, deconvolving the at least one second measurement log to correct the at least one second measurement log from shoulder bed effects, and, when the at least one second measurement log comprises a plurality of second measurement logs, repeating, for the rest of the second measurement logs, estimating the approximation of the forward physical model using a parameterized function so as to provide a second tool logging response and deconvolving the at least one second measurement log to correct the at least one second measurement log from shoulder bed effects.

The method may further comprise decoupling vertical and radial shoulder beds effects also with reference to the at least one second measurement log.

Deconvolving the at least one second measurement log may comprise determining layer boundaries, correcting the at least one second measurement log from vertical shoulder beds effects, and performing a radial inversion on each layer independently to assess the at least one second formation property in each radial zone.

When the method is intended to estimate multiple logging tool responses, any shoulder beds effects from measurement logs taken at multiple frequencies may be corrected.

According to an embodiment, the formation layer boundary locations are determined from selected measurement logs taken at a first, relatively higher frequency by approximating the tool response by a direct filter. Then, a deconvolution procedure may be performed.

The deconvolution may be based on a two-term energy minimization: the first term relates the measured dielectric properties to the original dielectric properties via a convolution, while the second term is an a priori term favoring step function versus depth solutions. With the knowledge of boundary locations for each formation layer, the formation properties within each layer for each measurement log are estimated using the logging tool response approximated for that particular measurement log.

Such a method may be applied also to anisotropic formations. For instance, by adding an automatic detection of anisotropic layers and an iterative estimation of the related anisotropy ratio in the workflow, deconvolution results similar to isotropic formations may be obtained.

The method may also be applied to analyze formations having radial effects such as standoff, mudcake, and radial invasion. The analysis on the radial effects can be performed independently and sequentially with respect to the vertical deconvolution.

For a tool response approximated by a convolution, the deconvolution may be expressed as $DCV(x_{meas}(z), \alpha)$. The deconvolution allows for the recovery of the initial profiles from the measurements upon a knowledge of the approximation model parameterized by $\alpha$.

The corrected profiles, $\tilde{x}(z)$, can then be expressed as follows:

$$\tilde{x}(z) = DCV(x_{meas}(z))$$

where the deconvolution algorithm works well when $\tilde{x}(z) \approx x_{true}(z)$.

In the case of a deconvolution, the DCV operation may have the following form:

$$\tilde{x}(z) = DCV(x_{meas}(z)) = \min_{x}(\|x_{meas} - k * x\|^2 + \lambda \cdot L(x))$$

where $L(x)$ is a regularization term. This regularization may be, for instance, the total variation, which is the integration of the absolute value of the gradient of x over the depth interval where the deconvolution is performed:

$$L(x) = TV(x) = \int |\nabla x(z)| dz$$

Figure 4:
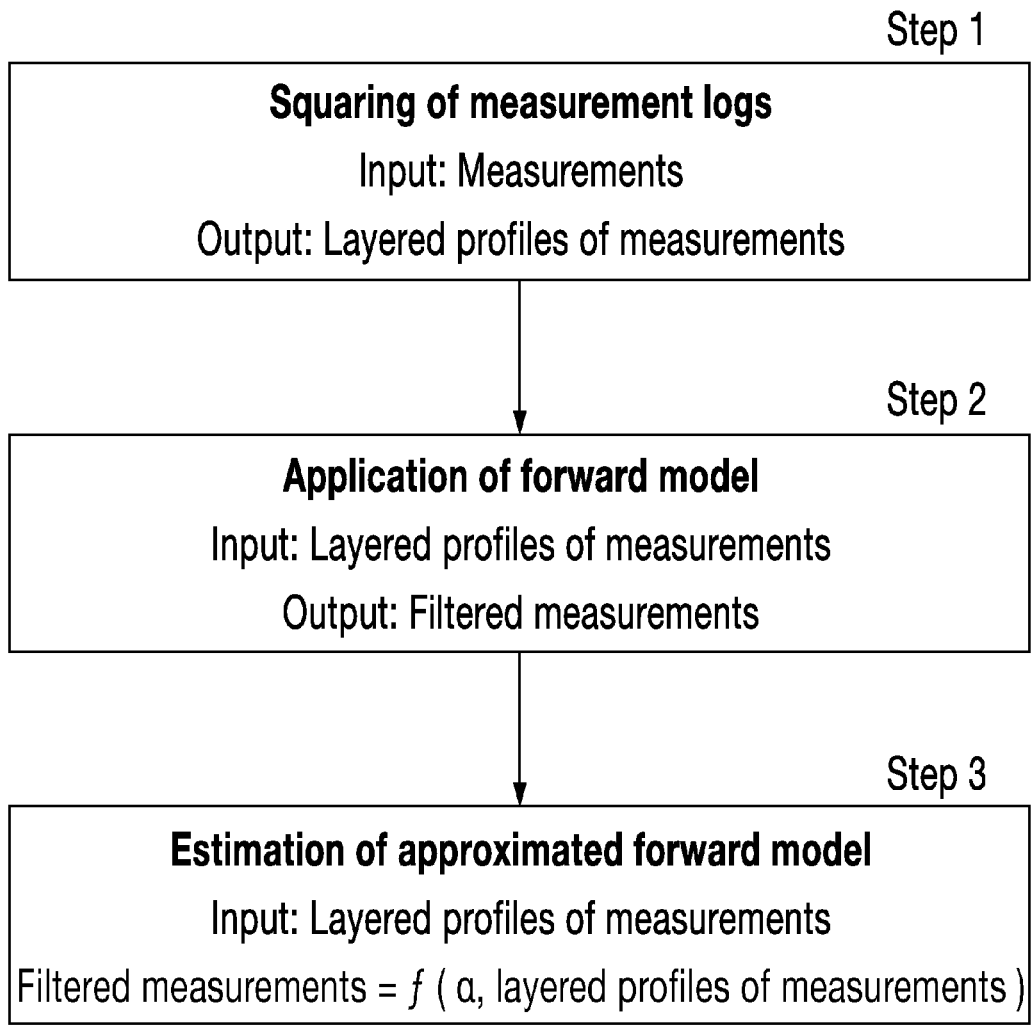
FIG. 4 shows a workflow of an embodiment of the method described herein.

FIG. 4 shows a workflow according to one embodiment of the method described herein. The approximation procedure may include squaring the measurements to obtain the layer boundary locations and the property values that can be used as inputs for the forward model.

FIG. 5 shows results obtained from a squaring process according to an embodiment of the method of the present disclosure. In FIG. 5, the X-axis represents the depth index and the Y-axis represents the formation property, for example resistivity. The continuous line represents the measurements and the dotted line represents the layered profiles extracted from the measurements.

The squaring process provides as output a squared log—named $x_{meas,squared}$ to define the layer boundaries and the property values for each layer. The squared log does not have to exactly match the measurement profiles, but only to capture a sketch of the measurement profiles. In the example shown in FIG. 5, some peaks are missing.

Subsequently, the forward model may be applied to the layered profiles (squared log) obtained as described above to derive the filtered measurements.

Figure 6:
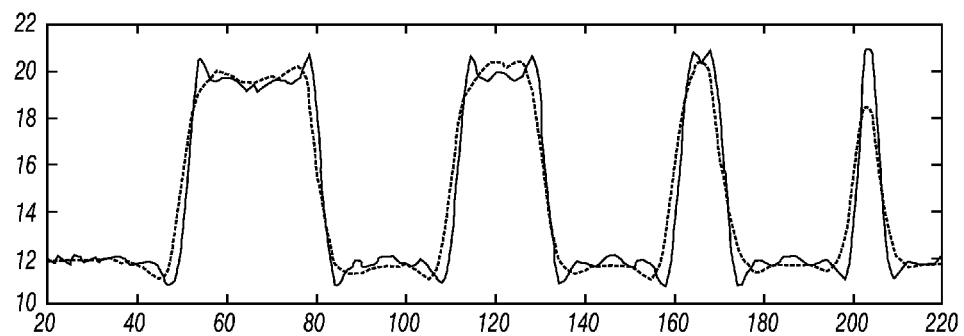
FIG. 6 shows results obtained from a forward modeling according to an embodiment of the method of the present disclosure.

FIG. 6 shows an example of results from such forward modeling. In FIG. 6, the X-axis represents the depth index and the Y-axis represents the formation property, such as for example conductivity. The continuous line represents the measurements and dotted line represents the filtered measurements. The filtered measurements can be denoted as $x_{meas,meas}(z)$.

In case of a convolution approximation, the approximation model may be then estimated by the following equation:

$$x_{meas,meas}(z) = FM(x_{meas,squared}) = f(\alpha, x_{meas,squared})$$

where the parameter $\alpha$ characterizing $f$ is an unknown vector.

In the case of a convolution, i.e. of a linear approximation, the previous equation can be written as:

$$x_{meas,meas}(z) \approx A(x_{meas,squared})\alpha$$

where A is a known matrix depending on the input measurements. In this case, this equation can be solved by a least squares estimation.

An embodiment of a method for correcting shoulder beds effects from measurement logs taken at multiple frequencies in a layered formation is described in the following.

The first logging tool response for a measurement log taken at the first, relatively higher frequency is approximated to determine the formation layer boundary locations. The measurement taken at the first frequency may be selected because that measurement may have a relatively good vertical resolution and the shoulder beds effects can be relatively weak. The approximation procedure described herein or any other suitable approximation procedures can be used to approximate the logging tool response.

The measurement log is then deconvolved using the deconvolution algorithm described herein or any other suitable deconvolution algorithms. The resulting log can be denoted as "deconvolved log". This corrected log is assumed to have a constant property value within each layer (squared log).

Then a new measurement log is selected, and the tool response for the newly selected measurement log may be estimated using either a squared version of the measurement as described above or the deconvolved log determined as described above.

The new measurement log is deconvolved and the corresponding tool response approximation is refined using an iterative procedure.

In order to process more measurement logs, new measurement logs are selected, and the tool response for the newly selected logs is approximated using the deconvolved measurement log determined as described above.

A specific order for processing the measurement logs may be defined with an a priori knowledge about the log profile similarities and the propagation of previously deconvolved measurement logs may be used for consistently approximating the tool responses.

An algorithm for the above method may be summarized as follows:

Step 1. Initialization of the procedure
selection of a measurement log, $x_{meas}^{0}(z)$, taken at the first, relatively higher frequency;
approximation of the first logging tool response for the measurement log characterized by $\alpha^0$;
deconvolution of the measurement log where the results can be given by $$DCV(x_{meas}^{0}(z),\alpha^{0})=\tilde{x}^{0}$$

Step 2. Initialization of the loop n=0

Step 3. Selection of a new measurement log with similar layer profiles: $x_{meas}^{n+1}(z)$ (similarity $x^{n+1}(z) \approx x^{n}(z)$, implied by an a priori knowledge)

Step 4. Approximation of the tool response for the new measurement log using, e.g., the equation:

$$FM_{n+1}(\tilde{x}^{n}) \approx f(\alpha^{n+1},\tilde{x}^{n})$$

where $FM_{n+1}$ is the forward model corresponding to the new measurement log indexed n+1 and $\alpha^{n+1}$ is an unknown vector;

Step 5. Refining of approximation
Deconvolution: e.g., $DCV(x_{meas}^{n+1}(z),\alpha^{n+1})=\tilde{x}^{n+1}$
Refining of $\alpha^{n+1}$ by using, e.g., the equation:

$$FM_{n+1}(\tilde{x}^{n+1}) \approx f(\alpha^{n+1},\tilde{x}^{n+1})$$

Deconvolution with the updated $\alpha^{n+1}$ using, e.g., the equation:

$$DCV(x_{meas}^{n+1}(z),\alpha^{n+1})=\tilde{x}^{n+1}$$

Step 6. n=n+1
Go to step 3.

Various logging tools can offer formation measurements over a wide range of frequencies.

The above method for estimating multiple tool responses may be for example implemented on a logging tool available from Schlumberger and designated as Dielectric Scanner™.

The logging tool may be incorporated in an apparatus for determining a plurality of formation properties, the apparatus comprising a logging tool as described above, at least one transmitting antenna mounted, and a plurality of spaced receiving antennas in relation to the at least one transmitting antenna.

According to an embodiment, the apparatus comprises a plurality of transmitters and receivers capable of propagating electromagnetic waves through the formation, measuring circuitry for measuring effects of the formation on the propagating waves, and control circuit arranged to combine the effects of the propagating waves that are varied according to frequency, spacing and polarization for determining the properties of the formation.

According to an embodiment, the apparatus may have two dipole orientations—longitudinal and transverse—, four spacings, and four frequencies. The method implemented on this apparatus may be summarized as follows:
an initialization is done with longitudinal orientation, spacing 4, highest frequency F3;
a propagation is done through the spacings, with the same orientation: initialize (spacing 3, longitudinal, F3), (spacing 2, longitudinal, F3);
a propagation is then done through the polarizations: initialize (spacing 4, transverse, F3);
a propagation is then done through the frequencies, for the longitudinal orientation: initialize (spacing 4, longitudinal, F2).

Figure 7:
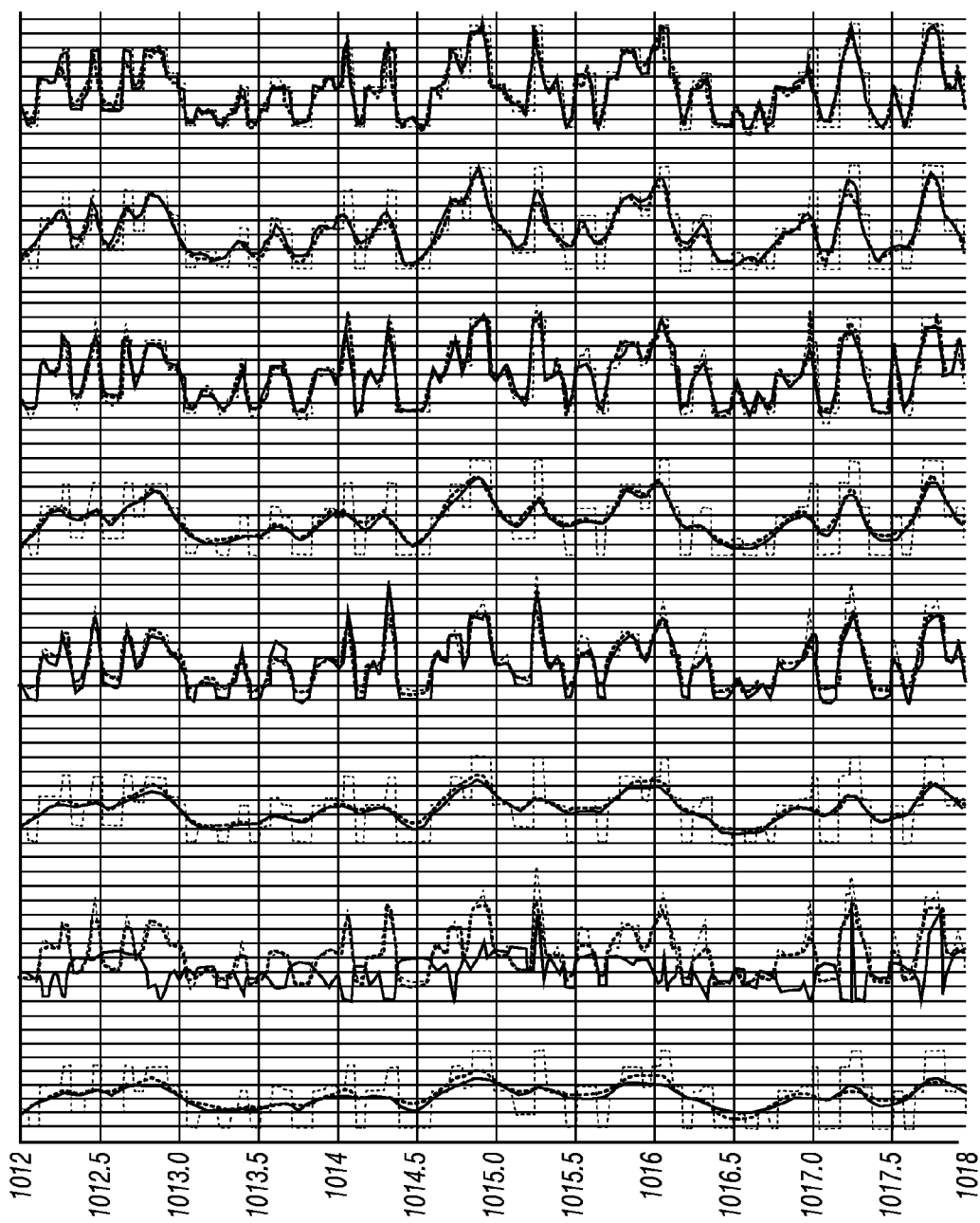
FIGS. 7 and 8 show results obtained according to an embodiment of the method of the present disclosure implemented on conductivity data obtained by a dielectric tool.
Figure 8:
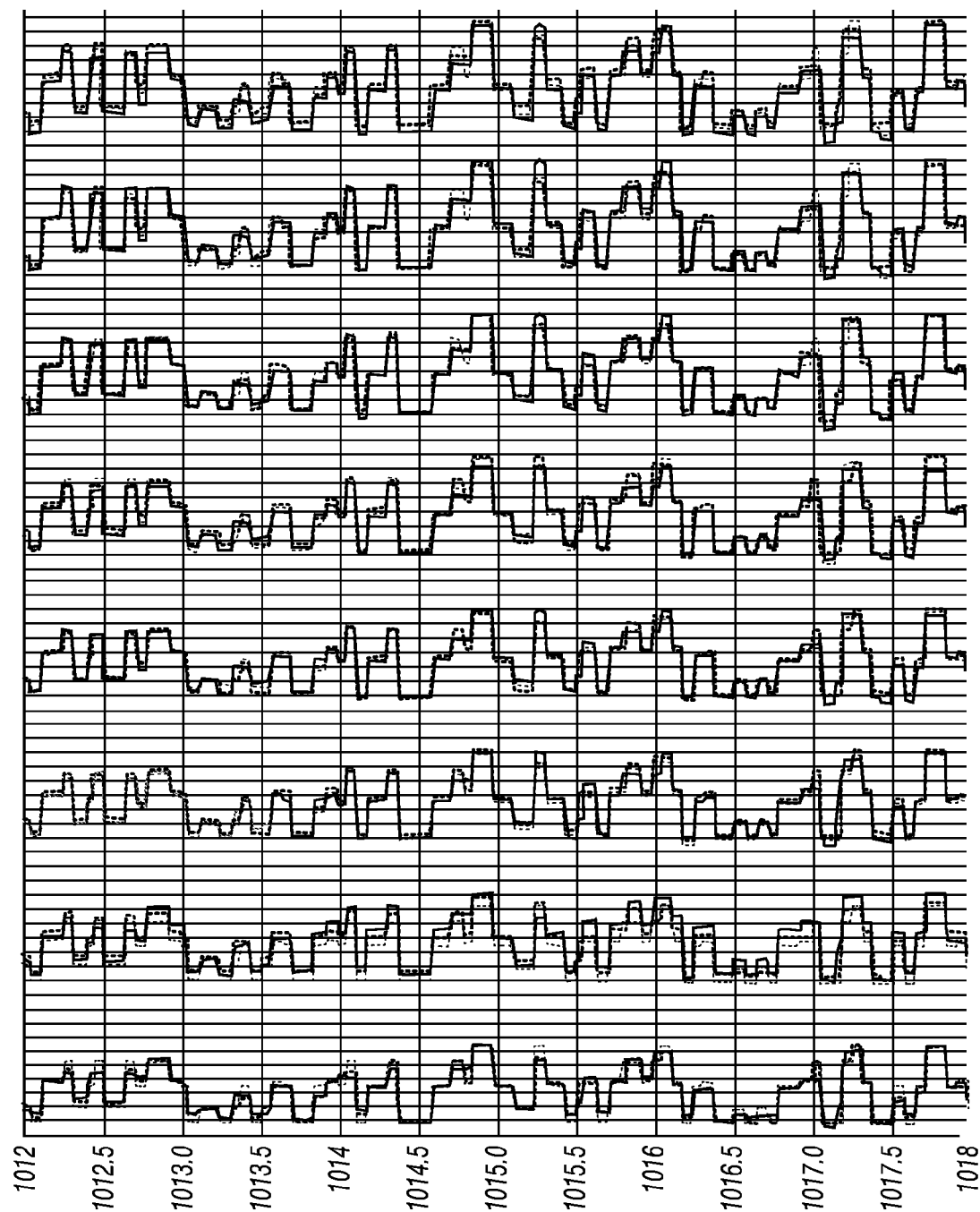

FIGS. 7 and 8 show example results where the above-mentioned method is implemented on conductivity data obtained by a dielectric tool. In FIGS. 7 and 8, the curves represent the data to be corrected and the measurements with shoulder beds effects. Each track corresponds to a specific frequency and a specific orientation and each curve corresponds to a specific spacing. The results show that the embodiment of the method described herein can substantially remove the shoulder beds effects on the measurements.

Vertical and radial shoulder beds effects may be decoupled. Where decoupling is made, the method described herein offers further advantages including treating both effects sequentially, thereby avoiding the use of a time-consuming and potentially unstable 2D-inversion procedure. Compared to the conventional techniques for vertical resolution enhancement, the method described herein may provide intrinsic resolution at about one inch and on microwave frequency range. In particular, the method described herein can improve the accuracy on the layered profiles and hence reduce the overshoots and undershoots on the estimation of formation properties, even on low frequency measurement logs, where strong shoulder beds effect can distort the initial logs. The initial vertical resolution can be recovered for all frequencies such that the uncertainty on the petrophysical properties including water-filled porosity, water salinity and rock textural factor, which are mostly derived from low frequencies measurements, may be reduced. As a result, a quantitative description of highly laminated reservoirs such as thin beds can be obtained.

The invention claimed is:

1. A method for estimating at least one logging tool response in a layered formation, the method comprising:
obtaining a first measurement log representative of at least one first electromagnetic property of the formation with a logging tool, wherein the first measurement log is affected by shoulder bed effects
obtaining a first layered profile of the at least one first measurement log using a squaring process;
obtaining a filtered measurement from the first layered profile using a forward physical model for the logging tool, wherein the forward physical model is a function linking the first electromagnetic property of the formation to the first measurement log; and
estimating a local approximation of the forward physical model using a parameterized function, wherein the approximation is determined based on the filtered measurement so as to provide a first logging tool response
deconvolving the at least one first measurement log by using the approximation of the forward physical model to correct the at least one first measurement log from shoulder bed effects,
determining the at least one first electromagnetic property of the formation based on the deconvoluted at least one measurement log.

2. The method according to claim 1, wherein the at least one first electromagnetic formation property is selected from the group comprising permittivity, conductivity, and resistivity.

3. The method according to claim 1, wherein the forward physical model is a first forward physical model, the method further comprising:
obtaining at least a second measurement log representative of at least one second electromagnetic property of the formation with the logging tool, wherein the second measurement log is affected by shoulder bed effects
obtaining a second layered profile of at least one second measurement log using a squaring process;

obtaining a filtered measurement from the second layered profile using a second forward physical model for the logging tool, wherein the second forward physical model is a function linking the second electromagnetic property of the formation to the second measurement log;

estimating an approximation of the second forward physical model using a parameterized function so as to provide a second logging tool response, wherein the approximation is determined based on the filtered measurement;

deconvolving the at least one second measurement log using the approximation of the forward physical model to correct the at least one second measurement log from shoulder bed effects; and when the at least one second measurement log comprises a plurality of second measurement logs, repeating approximation and deconvolution for the rest of the second measurement logs, determining the at least one second electromagnetic property of the formation based on the deconvoluted at least one second measurement logs.

4. The method according to claim 1, wherein the at least one first measurement log is taken at a first predetermined frequency.

5. The method according to claim 4, wherein the second measurement log is taken at a second predetermined frequency.

6. The method according to claim 3, wherein the first frequency is higher than the second frequency.

7. The method according to claim 3, wherein the at least one second formation property is selected from the group comprising permittivity, conductivity, and resistivity.

8. The method according to claim 3, wherein the at least one first formation property is permittivity and the at least one second formation property is conductivity.

9. The method according to claim 1, further comprising decoupling vertical and radial shoulder beds effects.

10. The method according to claim 3, wherein deconvolving the at least one first measurement log and/or deconvolving the at least one second measurement log each comprises:

determining layer boundaries;
correcting the at least one first measurement log and/or the at least one second measurement log from vertical shoulder beds effects;
performing a radial inversion on each layer independently to assess the at least one first formation property and/or the at least one second formation property in each radial zone.

11. A method for estimating at least one logging tool response in a layered formation, the method comprising:

a) selecting at least one first measurement log representative of at least one first electromagnetic property of the formation taken at a first frequency;

b) approximating a first forward model so as to provide a first logging tool response for the at least one first measurement log, wherein the first forward model is a function linking the first electromagnetic property of the formation to the first measurement log;

c) deconvolving the at least one first measurement log using the approximation to correct the at least one first measurement log from shoulder bed effects;

d) selecting at least one second measurement log representative of the at least one first electromagnetic property of the formation taken at a second frequency lower than the first frequency;

e) approximating a second forward physical model so as to provide a second logging tool response for the at least one second measurement log using the deconvolved at least one first measurement log, wherein the second forward physical model is a function linking the first electromagnetic property of the formation to the second measurement log;

f) deconvolving the at least one second measurement log using the approximation to correct the at least one second measurement log from shoulder bed effects; and g) when the at least one second measurement log comprises a plurality of second measurement logs, repeating d) to f) for the rest of the second measurement logs, h) determining the at least one first electromagnetic property of the formation based on the deconvoluted at least one first and second measurement logs.

12. The method according to claim 11, wherein approximating the first forward physical model so as to provide the first logging tool response and/or approximating the second forward physical model so as to provide the second logging tool response comprises:

obtaining a filtered measurement from the at least one first and/or second measurement log using the first and/or second forward physical model for the logging tool; and estimating an approximation of the first and/or second forward physical model using a parameterized function determined based on the filtered measurement.

13. A logging tool configured to perform a method according to claim 1.

14. An apparatus for determining at least one first formation property of a layered formation surrounding a borehole, the apparatus comprising:

a logging tool according to claim 13;
at least one transmitting antenna; and
a plurality of receiving antennas spaced in relation to the at least one transmitting antenna.

* * * * *